Patented Sept. 19, 1933

1,927,339

UNITED STATES PATENT OFFICE 1,927,339

TRIHYDROXY CARBOXYLIC ACID ESTER AND PROCESS FOR PRODUCING THE SAME

Nicolas Ernster, North Billerica, Mass., assignor to Smith-Ernster Laboratories, Inc., Cambridge, Mass., a corporation of Massachusetts No Drawing. Application April 21, 1926, Serial No. 103,529. Renewed January 26, 1933

8 Claims. (Cl. 260—104)

My invention relates to compounds having remedial effects and refers particularly to organic compounds of considerable curative values in the treatment of mucous membrane infections.

I have found that new organic compounds can be produced by an interaction between halogenated hydrins and tri-hydroxy carboxylic acids, their salts and oxides and that these new compounds have valuable therapeutic values, especially in the treatment of mucous membrane infections, such as hay fever.

Among the halogen substituted hydrins suitable for the carrying out of my process, I mention mono-, di-, and tri-chlor glycerine, and among the tri-hydroxy carboxylic acids suitable in my process, I prefer to employ gallic acid or tannic acid.

As examples of the process and products of my invention, I give the following:—

1—One mol of mono-chlor-hydrin (glycerine with one of the OH groups substituted by chlorine) is dissolved in water producing a 5 per cent solution of the substituted glycerine, a 9 per cent aqueous solution of 1 mol of gallic acid is made, care being taken that the latter solution is made neutral. The two above solutions are mixed together and warmed, preferably upon a waterbath, to 60°–80° C. for two hours. It is then evaporated to dryness at a low temperature, preferably in vacuum. The new compound thus formed is a grey powder slowly turning brown upon exposure to air. It is soluble in water and practically insoluble in alcohol. Its solution turns violet upon the addition of ferric chloride. A solution of copper sulphate produces a cherry red precipitate when added to a solution of the new compound, which turns to a brownish red solution when diluted with water and shaken. The reaction is probably $CH_2OH \cdot CHOH \cdot CH_2Cl + COONaC_6H_2(OH)_3 =$
$CH_2OH \cdot CHOH \cdot CH_2 \cdot COO \cdot C_6H_2(OH)_3 + NaCl$ 2—If 1 mol of di-chlor-hydrin and 2 mols of gallic acid are employed, the same strength solutions are used as indicated in Example 1. The mixture of the two solutions is boiled for about 20 minutes and then evaporated as above described. The product thus formed has the general reactions of the product of Example 1, the addition of copper sulphate, however, producing a brownish cherry red precipitate which does not readily dissolve. The formula of the product thus formed is probably $CH_2OH \cdot CH \cdot CH_2 \cdot (COO \cdot C_6H_2(OH)_3)_2$ 3—If 1 mol of tri-chlor-hydrin and 3 mols of a neutral salt of a gallic acid are employed, the formula of the produced product is probably $CH_2 \cdot CH \cdot CH_2 \cdot (COO \cdot C_6H_2(OH)_3)_3$ The products produced as above have special importance in the treatment of mucous membrane infections and especially in the infection known as hay fever, and I have found that the application of a weak solution of the infected membranes will have a most beneficial effect in cases of hay fever.

By "tri-hydroxic carboxylic compound" I mean the acids, their salts and oxides.

By "gallic compound", I mean the acid and its salts.

I do not limit myself to the particular chemicals, times, temperatures, quantities or steps of process as specificially mentioned and described as these are given simply as a means for clearly describing my invention.

What I claim is:—

1. The process of producing a pharmaceutical compound which comprises allowing aqueous solutions of halogen substituted glycerine and of a neutral salt of a tri-hydroxy carboxylic compound of the benzene series to react upon each other and isolating the thus produced organic compound.

2. The process of producing a pharmaceutical compound which comprises allowing aqueous solutions of mono-chlor-glycerine and of a neutral salt of a tri-hydroxy carboxylic compound of the benzene series to react upon each other and isolating the thus produced organic compound.

3. The process of producing a pharmaceutical compound which comprises allowing aqueous solutions of halogen substituted glycerine and of a neutral salt of gallic acid to react upon each other and isolating the thus produced organic compound.

4. The process of producing a pharmaceutical compound which comprises allowing aqueous solutions of mono-chlor-glycerine and of a neutral salt of gallic acid to react upon each other and isolating the thus produced organic compound.

5. As new organic compounds, the organic compounds capable of being produced by the interaction of halogen substituted glycerine and a neutral salt of a tri-hydroxy carboxylic compound of the benzene series, which products are of a grayish color, soluble in water, practically insoluble in alcohol, oxidizing to brown upon exposure to air, an aqueous solution of which turns violet upon the addition of ferric chloride, an aqueous solution forming a cherry red precipitate upon the addition of copper sulphate, the precipitate turning to a brownish red solution upon the addition of water.

6. As new organic compounds, the organic compounds capable of being produced by the reaction of mono-chlor-glycerine and a neutral salt of a tri-hydroxy carboxylic compound of the benzene series which products are of a grayish color, soluble in water, practically insoluble in alcohol, oxidizing to brown upon exposure to air, an aqueous solution of which turns violet upon the addition of ferric chloride, an aqueous solution forming a cherry red precipitate upon the addition of copper sulphate, the precipitate turning to a brownish red solution upon the addition of water.

7. As new organic compounds, the organic compounds capable of being produced by the interaction of halogen substituted glycerine and a neutral salt of gallic acid, which products are of a grayish color, soluble in water, practically insoluble in alcohol, oxidizing to brown upon exposure to air, an aqueous solution of which turns violet upon the addition of ferric chloride, an aqueous solution forming a cherry red precipitate upon the addition of copper sulphate, the precipitate turning to a brownish red solution uppn the addition of water.

8. As new organic compounds, the organic compounds capable of being produced by the interaction of mono-chlor-glycerine and a neutral salt of gallic acid, which products are of a grayish color, soluble in water, practically insoluble in alcohol, oxidizing to brown upon exposure to air, an aqueous solution of which turns violet upon the addition of ferric chloride, an aqueous solution forming a cherry red precipitate upon the addition of copper sulphate, the precipitate turning to a brownish red solution upon the addition of water.

NICOLAS ERNSTER.